US008776368B2

(12) United States Patent
Hindle

(10) Patent No.: US 8,776,368 B2
(45) Date of Patent: Jul. 15, 2014

(54) INTEGRATED HYDRAULIC HYBRID DRIVE MODULE AND METHOD OF INSTALLING SAME

(75) Inventor: Clive R. Hindle, Memphis, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 387 days.

(21) Appl. No.: 12/185,150

(22) Filed: Aug. 4, 2008

(65) Prior Publication Data

US 2009/0172942 A1   Jul. 9, 2009

Related U.S. Application Data

(60) Provisional application No. 60/953,731, filed on Aug. 3, 2007, provisional application No. 61/036,491, filed on Mar. 14, 2008, provisional application No. 61/007,505, filed on May 5, 2008.

(51) Int. Cl.
*B23P 17/00* (2006.01)
(52) U.S. Cl.
USPC .......................................................... 29/888
(58) Field of Classification Search
USPC .......................................................... 29/888
See application file for complete search history.

(56) References Cited

U.S. PATENT DOCUMENTS

| | | | |
|---|---|---|---|
| 3,892,283 A | 7/1975 | Johnson | |
| 4,098,144 A | 7/1978 | Besel et al. | |
| 4,215,545 A | 8/1980 | Morello et al. | |
| 4,246,978 A | 1/1981 | Schulz et al. | |
| 4,320,814 A | 3/1982 | Middelhoven | |
| 4,382,484 A | 5/1983 | Anderson et al. | |
| 4,441,573 A | 4/1984 | Carman et al. | |
| 6,170,587 B1 | 1/2001 | Bullock | |
| 6,397,965 B1 | 6/2002 | McFarlane et al. | |
| 6,719,080 B1 | 4/2004 | Gray, Jr. | |
| 6,959,545 B2 | 11/2005 | Lippert et al. | |
| 7,082,757 B2 | 8/2006 | Teslak et al. | |
| 7,100,723 B2 | 9/2006 | Roethler et al. | |
| 7,134,980 B2 | 11/2006 | Kroppe | |
| 7,232,192 B2 | 6/2007 | Teslak et al. | |
| 7,520,355 B2 * | 4/2009 | Chaney | 180/68.5 |

(Continued)

FOREIGN PATENT DOCUMENTS

| | | |
|---|---|---|
| EP | 1329351 A1 | 7/2003 |
| EP | 1740406 A2 | 1/2007 |
| GB | 2401591 A | 11/2004 |
| JP | 2005138792 A | 6/2005 |

OTHER PUBLICATIONS

Search Report for PCT/US2008/072057 dated Mar. 31, 2009.

(Continued)

*Primary Examiner* — David Bryant
*Assistant Examiner* — Moshe Wilensky
(74) *Attorney, Agent, or Firm* — MacMillan, Sobanski & Todd, LLC

(57) ABSTRACT

A method of installing a hybrid drive system in a drive train system includes the preliminary step of providing a cradle, a plurality of components of a hybrid drive system, and a drive train system. The cradle and the plurality of components are initially assembled together to provide an integrated cradle and hybrid drive module. Then, the integrated cradle and hybrid drive module are subsequently installed in the drive train system. The hybrid drive system may be actuated hydraulically, electrically, or otherwise as desired.

13 Claims, 7 Drawing Sheets

(56) References Cited

U.S. PATENT DOCUMENTS

| | | |
|---|---|---|
| 2004/0251067 A1 | 12/2004 | Gray, Jr. et al. |
| 2005/0017580 A1 | 1/2005 | Cikanek et al. |
| 2005/0166586 A1 | 8/2005 | Lippert et al. |
| 2005/0167177 A1 | 8/2005 | Roethler et al. |
| 2005/0193730 A1 | 9/2005 | Rose |
| 2005/0241437 A1 | 11/2005 | Gray, Jr. et al. |
| 2005/0269141 A1 | 12/2005 | Davis et al. |
| 2006/0000659 A1 | 1/2006 | Teslak et al. |
| 2006/0101645 A1 | 5/2006 | Stone |
| 2006/0118346 A1 | 6/2006 | Rampen et al. |
| 2006/0137925 A1 | 6/2006 | Viergever et al. |
| 2006/0185356 A1 | 8/2006 | O'Brien, II |
| 2006/0197375 A1 | 9/2006 | Delaney |
| 2007/0218786 A1 | 9/2007 | Tamba et al. |
| 2008/0169139 A1* | 7/2008 | Kramer .................. 180/65.2 |
| 2008/0251302 A1 | 10/2008 | Lynn et al. |

OTHER PUBLICATIONS

Extended European Search Report, Application No. EP 08797084.4 dated Dec. 13, 2013.

* cited by examiner

INTEGRATED HYDRAULIC HYBRID DRIVE MODULE AND METHOD OF INSTALLING SAME

CROSS-REFERENCE TO RELATED APPLICATIONS

This application claims the benefit of U.S. Provisional Application No. 60/953,731 filed Aug. 3, 2007, U.S. Provisional Application No. 61/036,491 filed Mar. 14, 2008, and U.S. Provisional Application No. 61/007,505 filed May 5, 2008. The disclosures of all of these provisional applications are incorporated herein by reference.

BACKGROUND OF THE INVENTION

This invention relates in general to hybrid drive systems and methods of installing such hybrid drive systems in vehicles and other mechanisms. In particular, this invention relates to an integrated hybrid drive module and to a method of installing and removing such an integrated hybrid drive module in a vehicle or other mechanism.

Drive train systems are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle so as to rotatably drive the wheels of the vehicle.

In some vehicles and other mechanisms, a hybrid drive system is provided in conjunction with the drive train system for accumulating energy during braking of the rotatably driven mechanism and for using such accumulated energy to assist in subsequently rotatably driving the rotatably driven mechanism. To accomplish this, a typical hybrid drive system includes an energy storage device and a reversible energy transfer machine. The reversible energy transfer machine communicates with the energy storage device and is mechanically coupled to a portion of the drive train system. Typically, the hybrid drive system can be operated in either a retarding mode, a neutral mode, or a driving mode. In the retarding mode, the reversible energy transfer machine of the hybrid drive system accumulates energy by braking or otherwise retarding the rotatably driven mechanism of the drive train system and stores such energy in the energy storage device. In the neutral mode, the hybrid drive system is disconnected from the drive train system and, therefore, is substantially inoperative to exert any significant driving or retarding influence on the rotatably driven mechanism. In the driving mode, the reversible energy transfer machine of the hybrid drive system supplies the accumulated energy previously stored in the energy storage device to assist in subsequently rotatably driving the rotatably driven mechanism.

One commonly known hybrid drive system uses pressurized fluid as the actuating mechanism. In such a hydraulic hybrid drive system, a fluid energy storage device (such as an accumulator) and a reversible hydraulic machine are provided. Another commonly known hybrid drive system uses electricity as the actuating mechanism. In such an electric hybrid drive system, an electrical energy storage device (such as a battery) and a reversible electric machine are provided. Other hybrid drive systems are known in the art that use other actuating mechanisms.

Regardless of the specific actuating mechanism that is used, the hybrid drive system typically includes a variety of individual components. For example, a typical hydraulic hybrid drive system includes a plurality of hydraulic and pneumatic components, such as pumps, motors, accumulators, filters, and associated fluid conduits. In the past, these components have been installed on the vehicle or other mechanism in a piece-by-piece manner. Although this method of assembly has been effective, it has been found to be undesirable for several reasons. For example, in the context of the hydraulic hybrid drive system, such piece-by-piece assembly of the components of the hydraulic hybrid drive system often occurs in a relatively unclean environment. As a result, dirt and other contaminants can be unintentionally introduced into the hydraulic hybrid drive system, which can result undesirable maintenance time and expense. Additionally, such piece-by-piece assembly of the components of the hydraulic hybrid drive system prevents preliminary cleaning or testing of the entire system until after it has been fully installed within the vehicle or other mechanism. Lastly, the hydraulic hybrid drive system is often used in vehicles and other mechanisms having significant space and clearance restraints, thus causing installation (and subsequent removal if necessary) to be relatively difficult and time consuming. Accordingly, it would be desirable to provide an improved structure for a hybrid drive system and an improved method of installing and removing such a hybrid drive system in a vehicle or other mechanism.

SUMMARY OF THE INVENTION

This invention relates to an improved structure for a hybrid drive system and an improved method of installing and removing such a hybrid drive system in a vehicle or other mechanism. Preliminarily, a cradle, a plurality of components of a hybrid drive system, and a drive train system are provided. The cradle and the plurality of components are initially assembled together to provide an integrated cradle and hybrid drive module. Then, the integrated cradle and hybrid drive module are subsequently installed in the drive train system. The hybrid drive system may be actuated hydraulically, electrically, or otherwise as desired.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
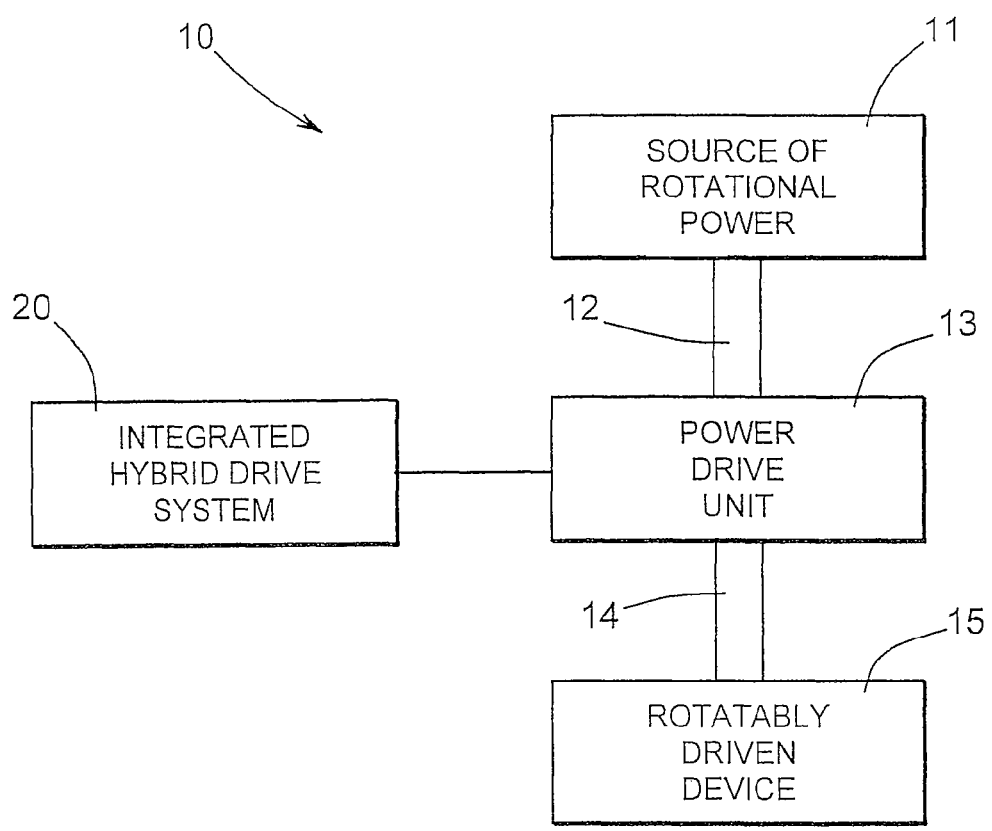
FIG. 1 is a block diagram of a drive train system including an integrated hybrid drive module in accordance with this invention.

Referring now to the drawings, there is illustrated in FIG. 1 a block diagram of a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1 or with drive train systems in general. On the contrary, as will become apparent below, this invention may be used in any desired environment for the purposes described below.

The illustrated drive train system 10 is a vehicular drive train system that includes a source of rotational power 11 that may, for example, be embodied as a conventional internal combustion or diesel engine. A first driveshaft 12 is provided for transferring rotational power from an output shaft (not shown) of the source of rotational power 11 to an input shaft (not shown) of a power drive unit 13. If desired, a conventional torsional damper (not shown) or other vibration dampening mechanism may be provided between the output shaft of the engine 11 and the input shaft of the power drive unit 13. The power drive unit 13 is conventional in the art and may, for example, be embodied as a hydraulically-based device that is configured to operate in either a hydrostatic mode at relatively low speeds (such as below approximately forty-five miles per hour, for example) or in a direct drive mode at relatively high speeds (such as above approximately forty-five miles per hour, for example). However, the power drive unit 13 may be embodied as any other rotational power transferring mechanism and may or may not, as desired, including a variable gear ratio mechanism. The illustrated drive train system 10 also includes a second driveshaft 14 for transferring rotational power from an output shaft (not shown) of the power drive unit 13 to an input shaft (not shown) of a rotatably driven device 15. The rotatably driven device 15 may, for example, be embodied as a conventional axle assembly including a differential (not shown) that rotatably drives a pair of driven wheels (not shown) of the vehicle.

Figure 2:
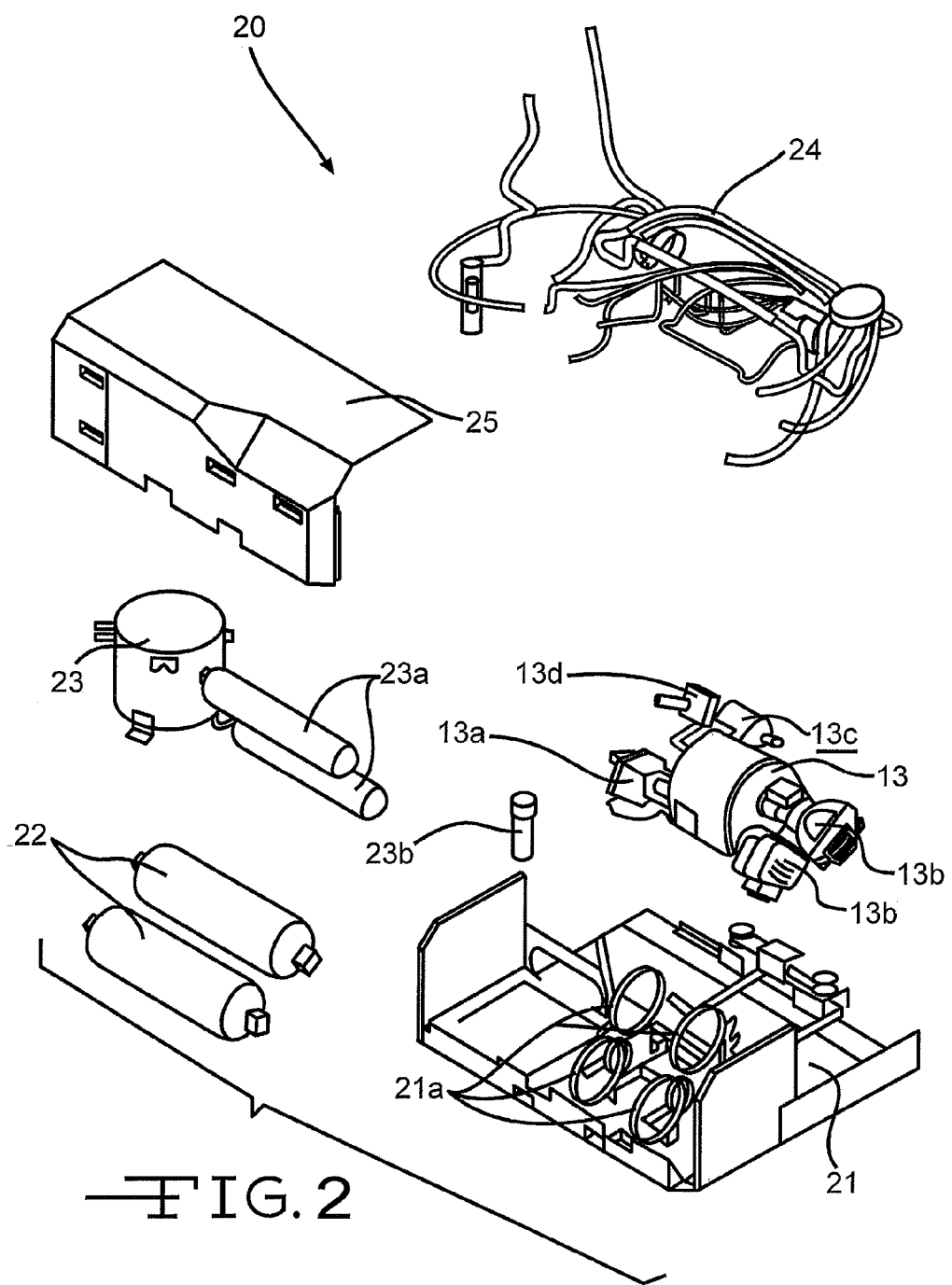
FIG. 2 is an exploded perspective view of the components of an integrated hydraulic hybrid drive module and a power drive unit shown prior to assembly.

The components of the exemplary power drive unit 13 of the drive train system 10 are illustrated in FIG. 2. As shown therein, the illustrated power drive unit 13 includes a primary pump 13a that may be connected to the input shaft so as to be rotatably driven by the driveshaft 12 whenever the source of rotational power 11 is operated. The primary pump 13a supplies pressurized fluid to one or more pump/motors 13b. In the illustrated embodiment, the primary pump 13a supplies pressurized fluid to two of such pump/motors 13b, although a greater or lesser number may be provided. An electronic controller (not shown) determines in a conventional manner how and when the pressurized fluid from the primary pump 13a is directed to and used by the pump/motors 13b. If desired, a power take-off 13c can be provided on the power drive unit 13 to operate a hydraulic pump 13d or other driven mechanism in a conventional manner. The power take-off 13c and the hydraulic pump 13d may be provided to selectively operate one or more auxiliary devices that are provided on the vehicle, such as trash handling mechanisms that are provided on a garbage truck, for example.

The pump/motors 13b are capable of driving the output shaft of the pump drive unit 13 through a hydrostatic gear reduction (such as a simple two-speed low/high hydrostatic gear reduction, for example) relative to the rotational speed of the input shaft. Typically, when the vehicle is started from rest, the electronic controller causes the power drive unit 13 to start in the low hydrostatic gear ratio, then subsequently shift to the high hydrostatic gear ratio when the vehicle reaches a first predetermined speed. Thereafter, when the vehicle reaches a second predetermined speed that is higher than the first predetermined speed, the power drive unit 13 shifts from the high hydrostatic gear ratio to the direct drive gear ratio, as mentioned above. When operated in the direct drive mode, the hydrostatic components of the power drive unit 13 are bypassed to maximize operational efficiency.

The drive train system 10 further includes a hybrid drive system, indicated generally at 20. The hybrid drive system 20 is provided in conjunction with the drive train system 10 for accumulating energy during braking of the rotatably driven device 15 and for using such accumulated energy to assist in subsequently rotatably driving the rotatably driven device 15. As will be explained in greater detail below, the illustrated hybrid drive system 20 is a hydraulically-based device that includes a fluid energy storage accumulator and a reversible hydraulic machine. The reversible hydraulic machine communicates with the fluid energy storage accumulator and is mechanically coupled to a portion of the power drive unit 13 of the drive train system 10. However, the illustrated hybrid drive system 20 is intended to be representative of any type of hybrid drive system, such as those that use electricity as the actuating mechanism. In such an electric hybrid drive system, an electrical energy storage device (such as a battery) and a reversible electric machine are provided. Other hybrid drive systems are known in the art that use other actuating mechanisms, and all of such hybrid drive systems are intended to be within the scope of this invention.

The illustrated hydraulic hybrid drive system 20 can be operated in either a retarding mode, a neutral mode, or a driving mode. In the retarding mode, the reversible hydraulic machine of the illustrated hydraulic hybrid drive system 20 accumulates energy by braking or otherwise retarding the rotatably driven device 15 of the drive train system 10 and stores such energy in the fluid energy storage accumulator. In the neutral mode, the illustrated hydraulic hybrid drive system 20 is disconnected from the drive train system 10 and, therefore, is substantially inoperative to exert any significant driving or retarding influence on the rotatably driven device 15. In the driving mode, the reversible hydraulic machine of the illustrated hydraulic hybrid drive system 20 supplies the accumulated energy previously stored in the fluid energy storage accumulator to assist in subsequently rotatably driving the rotatably driven device 15.

The components of the illustrated hydraulic hybrid drive system 20 of the drive train system 10 is illustrated in detail in FIG. 2. As shown therein, the illustrated hydraulic hybrid drive system 20 includes a cradle 21 that is formed from one or more rigid structural components that are adapted to support a variety of other components of the hydraulic hybrid drive system 20 in the manner described below. The cradle 21 may be formed having any desired shape and may be formed from any desired material or combination of materials. Preferably, however, the cradle 21 is formed from a plurality of sheet metal components that are secured together, such as by welding and/or mechanical fasteners. The cradle 21 can have a plurality of clamps 21a provided thereon for a purpose that will be described below.

Figure 3:
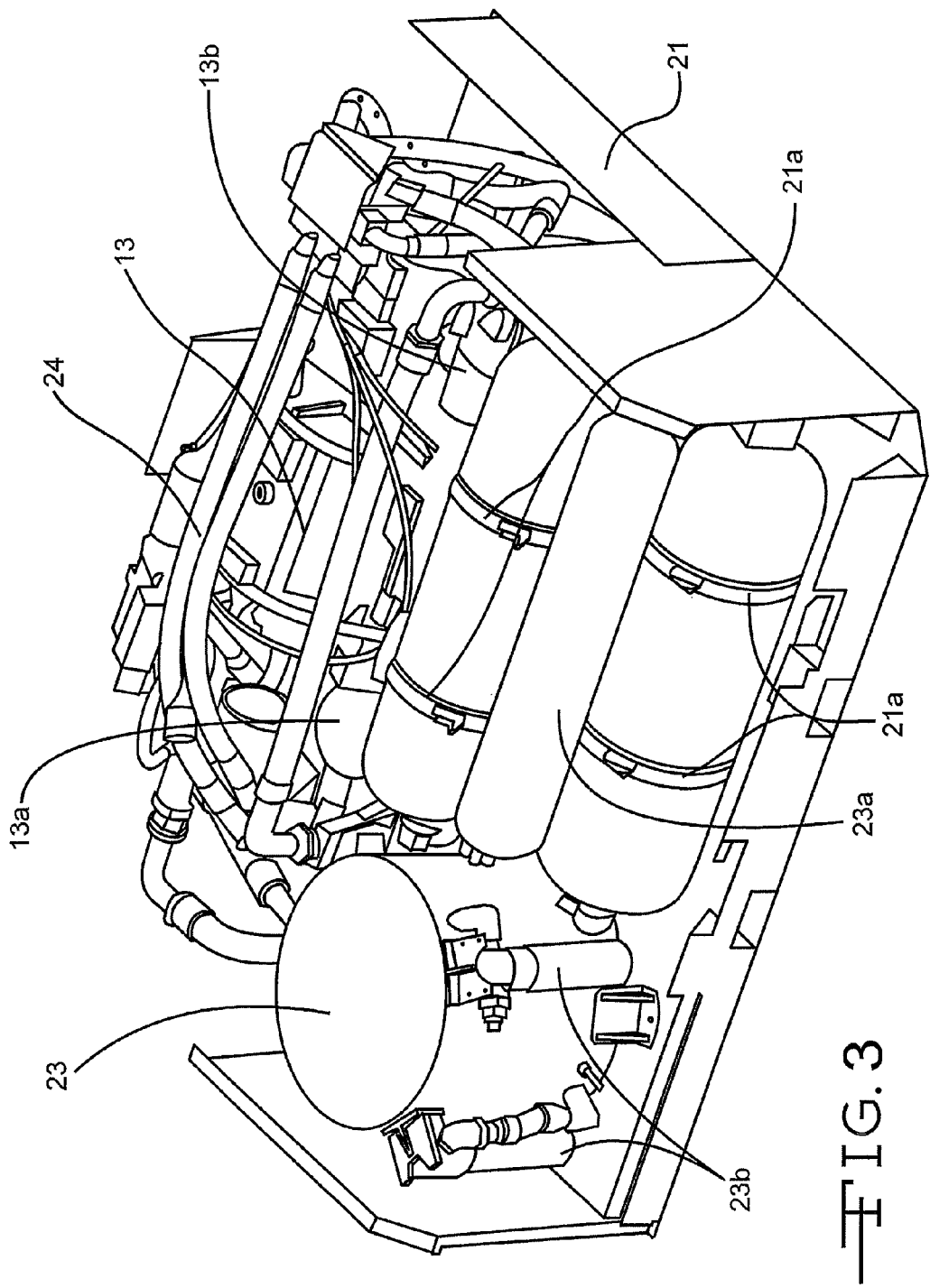
FIG. 3 is a perspective view of the integrated hydraulic hybrid drive module and the power drive unit illustrated in FIG. 2 shown after assembly.
Figure 4:
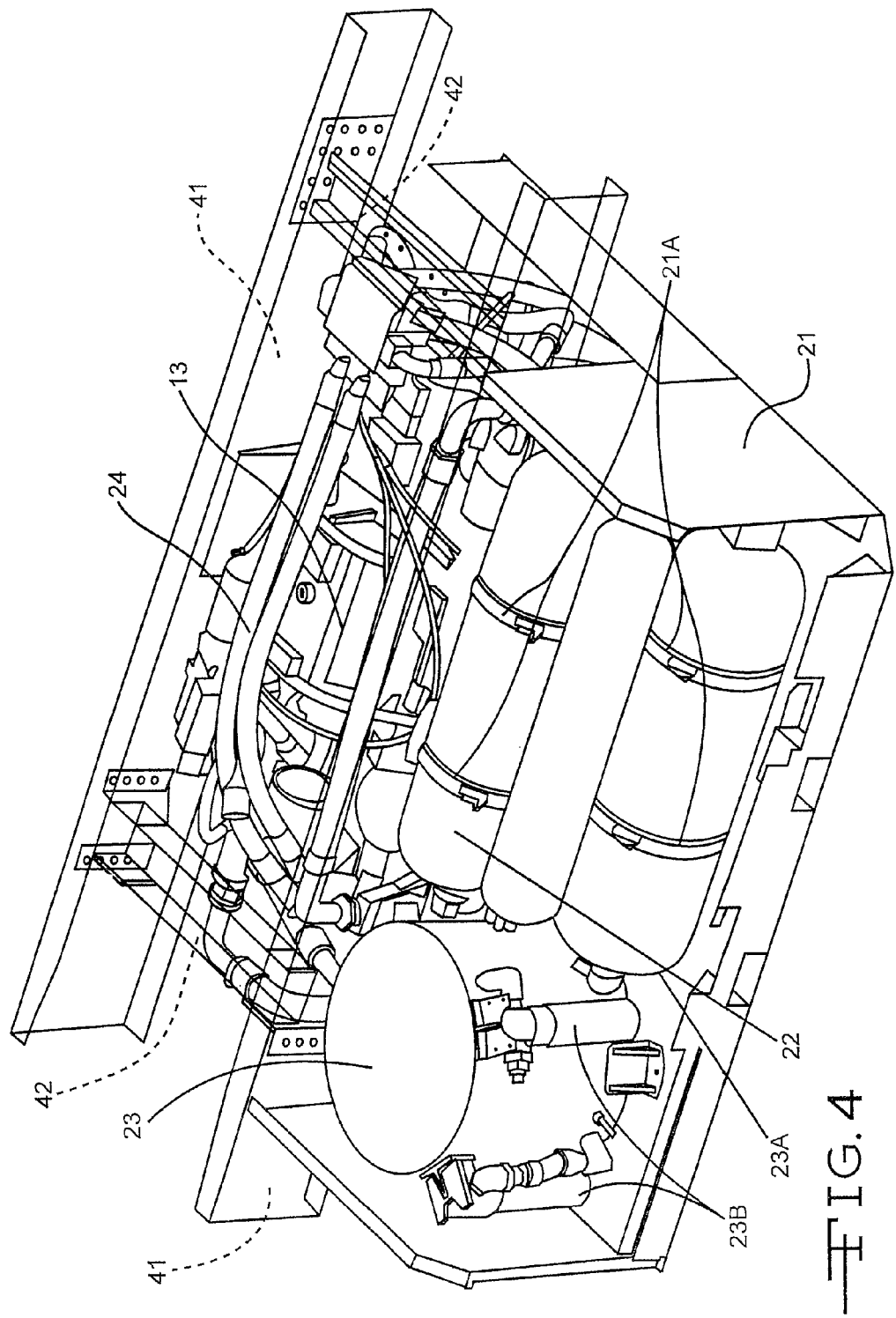
FIG. 4 is a perspective view of the integrated hydraulic hybrid drive module and the power drive unit illustrated in FIG. 3 shown after assembly with a portion of a frame (shown in phantom) of a vehicle.
Figure 5:
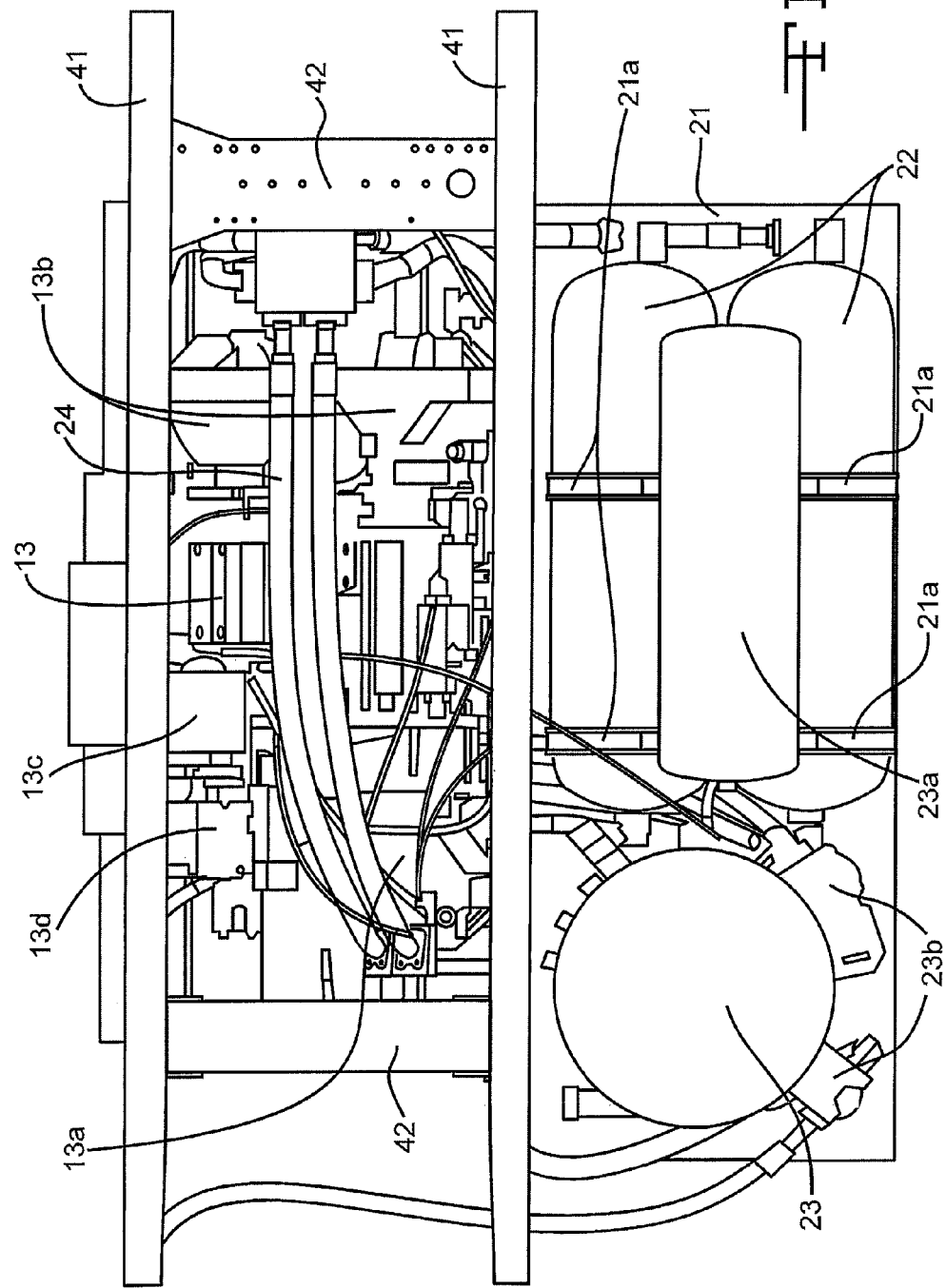
FIG. 5 is a top plan view of the integrated hydraulic hybrid drive module, the power drive unit, and the portion of the frame of the vehicle illustrated in FIG. 4.

The illustrated hydraulic hybrid drive system 20 also includes one or more high pressure accumulators 22. The high pressure accumulators 22 are conventional in the art and are intended to be representative of any mechanism that can provide fluid pressure at a relatively high magnitude. In the illustrated embodiment, two of such high pressure accumulators 22 are provided. However, a greater or lesser number of such high pressure accumulators 22 may be provided as desired. As shown in FIGS. 3, 4, and 5, the high pressure accumulators 22 are adapted to be received within the clamps 21a and thereby be securely supported on the cradle 21 when the components of the illustrated hydraulic hybrid drive system 20 are assembled with the cradle 21 in the manner described below.

The illustrated hydraulic hybrid drive system 20 further includes a low pressure oil reservoir 23. The low pressure oil reservoir 23 is conventional in the art and is intended to be representative of any mechanism that can provide fluid pressure at a relatively low magnitude. In the illustrated embodiment, a plurality of air tanks 23a are provided with the low pressure oil reservoir 23, although such is not required. Additionally, one or more filters 23b (see FIGS. 3, 4, and 5) may be provided with the low pressure oil reservoir 23, although again such is not required.

Figure 6:
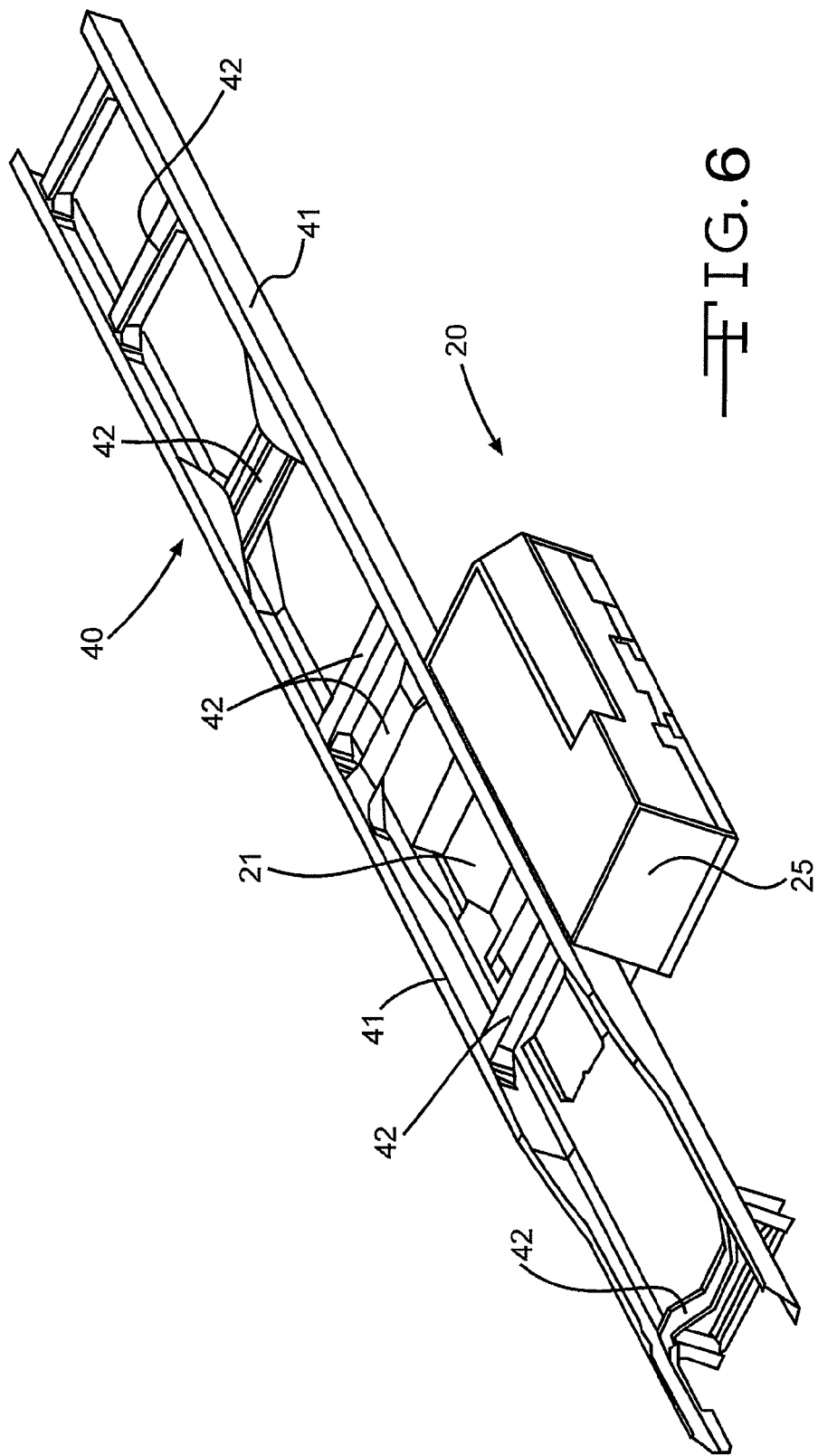
FIG. 6 is a perspective view of the integrated hydraulic hybrid drive module, including a protective cover, and the entire frame of the vehicle illustrated in FIGS. 4 and 5.

The illustrated hydraulic hybrid drive system 20 additionally includes a variety of fluid conduits 24. The fluid conduits 24 are conventional in the art and are intended to be representative of any mechanism that can provide fluid communication between the various components of the illustrated hydraulic hybrid drive system 20 described above. In the illustrated embodiment, the fluid conduits 24 include a variety of flexible hoses, rigid pipes, and associated fittings. When the various components of the illustrated hydraulic hybrid drive system 20 are assembled as described below, the hydraulic hybrid drive system 20 cooperates with the power drive unit 13. Lastly, the illustrated hydraulic hybrid drive system 20 includes a cover 25. The cover 25 is preferably formed from a plurality of sheet metal components that are secured together, such as by welding. As shown in FIG. 6, the cover 25 is provided to protectively cover the various components of the illustrated hydraulic hybrid drive system 20 described above. However, the use of the cover 25 is optional.

Figure 7:
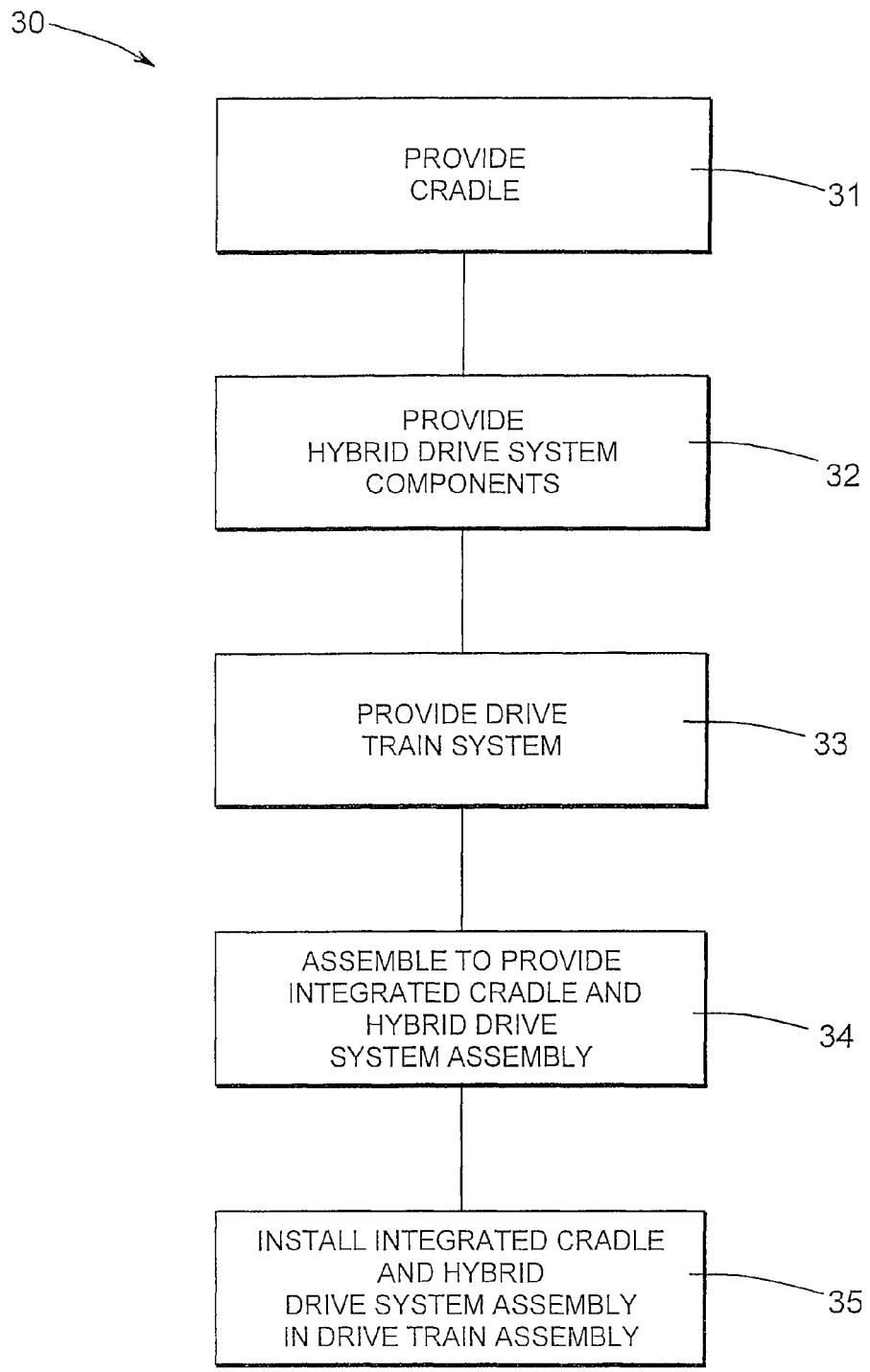
FIG. 7 is a flowchart of a method of installing the integrated hybrid drive module in the drive train system in accordance with this invention.

FIG. 7 is a flowchart of a method, indicated generally at 30, of installing the integrated hybrid drive module in the drive train system 10 in accordance with this invention. In a first step 31 of the method 30, the cradle 21 described above is provided. In a second step 32 of the method 30, a plurality of other components of the hybrid drive system 20 are provided. As described above, these other of components of the hybrid drive system 20 can include some or all of the high pressure accumulators 22, the low pressure oil reservoir 23 (including the air tanks 23a and the filters 23b), the fluid conduits 24, and the cover 25, as well as other conventional components that are neither shown nor described herein but are well known to persons having ordinary skill in the art. In a third step 33 of the method 30, the drive train system 10 is provided. As described above, the drive train system 10 can include some or all of the source of rotational power 11, the first driveshaft 12, the power drive unit 13, the second driveshaft 14, and the rotatably driven device 15. The first, second, and third steps 31, 32, and 33 of the method 30 can be performed in any desired order or simultaneously as desired.

In a fourth step 34 of the method 30 of this invention, the cradle 21 and the other components of the hybrid drive system 20 are initially assembled together to provide an integrated cradle and hybrid drive module, as shown in FIG. 3. To accomplish this, the above-described other of components of the hybrid drive system 20 (including some or all of the high pressure accumulators 22, the low pressure oil reservoir 23, the air tanks 23a, the filters 23b, the fluid conduits 24, and the cover 25) are assembled together and mounted on the cradle 21. The assembly of the various components of the hybrid drive system 20 can be accomplished in any desired manner and in any desired order of operations. For example, the high pressure accumulators 22 can be disposed within and supported on the plurality of clamps 21a provided on the cradle 21, while the low pressure oil reservoir 23 can be secured to the cradle 21 by brackets (not shown) or other conventional mounting structures. The fluid conduits 24 can be used to provide fluid communication between the various components of the hybrid drive system 20 in a conventional manner. At the conclusion of this fourth step 34 in the method 30 of this invention, an integrated cradle and hybrid drive module is provided.

When its various components are assembled, the hybrid drive system 20 can function in the manner described above to accumulate energy during braking of the rotatably driven device 15 and to use such accumulated energy to assist in subsequently rotatably driving the rotatably driven device 15. The manner of operation of the hybrid drive system 20 is well known to those skilled in the art, and a detailed understanding thereof is not necessary for a complete understanding of this invention.

If desired, the power drive unit 13 of the drive train system 10 can be assembled on the cradle 21 with the components of the hybrid drive system 20. This may be desirable because the fluid conduits 24 not only provide fluid communication between the various components of the hybrid drive system 20, but additionally provide fluid communication between the components of the hybrid drive system 20 and the components of the power drive unit 13 of the drive train system 10. Thus, as also shown in FIG. 3, the power drive unit 13 of the drive train system 10 can be assembled on the cradle 21 with the other components of the hybrid drive system 20. However, the power drive unit 13 of the drive train system 10 need not be initially assembled with the components of the hybrid drive system 20 if desired.

Thereafter, in a fifth step 35 of the method 30 of this invention, the integrated cradle and hybrid drive module is subsequently installed in the drive train system 10. This can, for example, be accomplished by providing a vehicular frame assembly 40 (see FIG. 6) that includes a pair of side rails 41 having a plurality of cross members 42 extending therebetween. The side rails 41 typically extend generally longitudinally throughout some or all of the length of the vehicle and may each be provided as unitary side rails or as an assembly of a plurality of side rail sections that are secured together. The cross members 42 typically extend generally transversely between the pair of side rails 41, are spaced apart from one another throughout some or all of the length of the vehicle, and may each be provided as unitary cross members or as an assembly of a plurality of cross member sections that are secured together. Regardless, it will be appreciated that the vehicular frame assembly 40 may be formed having any desired shape or configuration.

The cradle 21 is preferably sized and shaped such that one or more portions thereof are aligned with portions of the side rails 41 or the cross members 42 (or both, if desired) of the vehicular frame assembly 40 when the integrated cradle and hybrid drive module is disposed adjacent thereto, as best shown in FIGS. 4 and 5. As a result, the cradle 21 and the other portions of the integrated cradle and hybrid drive module can be quickly and easily secured to the vehicular frame assembly 40 as an integrated unit using any conventional means, such as bolts, brackets, and the like. Similarly, the cradle 21 and the other portions of the integrated cradle and hybrid drive module can be quickly and easily removed from the vehicular frame assembly 40 as an integrated unit simply by removing such bolts, brackets, and the like when service or replacement is needed.

As discussed above, in the past, the various components of the hybrid drive system 20 have been installed on the vehicle frame assembly 40 or other mechanism in a piece-by-piece manner. By initially assembling the components of the hybrid drive system 20 on the cradle 21 to provide an integrated cradle and hybrid drive module before subsequent installation on the frame assembly 40, several advantages are achieved. First, the initial assembly of the components of the hybrid drive system 20 can be accomplished in a clean environment, which prevents dirt and other contaminants from being introduced therein. Second, the initial assembly of the components of the hybrid drive system 20 allows complete testing of the system before it has been fully installed within the vehicle or other mechanism. Third, the initial assembly of the components of the hybrid drive system 20 facilitates the installation and removal thereof in a relatively quick and easy manner.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of installing a hybrid drive system in a drive train system comprising the steps of:
   (a) providing a vehicle including a drive train system having a source of rotational power, a power drive unit that is rotatably driven by the source of rotational power, and a rotatably driven device that is rotatably driven by the power drive unit;
   (b) providing a hybrid drive system including an energy storage device that is adapted to store energy and a reversible energy transfer machine that is adapted to accumulate energy in the energy storage device by retarding the drive train system during braking and to supply energy stored in the energy storage device to assist in subsequently driving the drive train system;
   (c) providing a cradle;
   (d) initially assembling the cradle and a plurality of components, including the energy storage device and the reversible energy transfer machine, of the hybrid drive system together to provide an integrated cradle and hybrid drive module, structurally supporting the power drive unit on the cradle, and connecting the integrated cradle and hybrid drive module to the power drive unit; and
   (e) subsequently installing the integrated cradle and hybrid drive module on the vehicle and in cooperation with the drive train system.

2. The method defined in claim 1 wherein step (a) is performed by providing a vehicle having a frame assembly and by supporting the source of rotational power, the power drive unit, and the rotatably driven device on the frame assembly.

3. The method defined in claim 2 wherein step (e) is performed by supporting the integrated cradle and hybrid drive module on the frame assembly and connecting the integrated cradle and hybrid drive module to the power drive unit.

4. The method defined in claim 1 wherein step (a) is performed by providing a vehicle having a frame assembly and by supporting the source of rotational power and the rotatably driven device on the frame assembly.

5. The method defined in claim 4 wherein step (e) is performed by supporting the integrated cradle and hybrid drive module and the power drive unit on the frame assembly.

6. The method defined in claim 1 wherein step (b) is performed by providing a high pressure accumulator, a low pressure oil reservoir, and a plurality of fluid conduits.

7. The method defined in claim 1 wherein step (b) is performed by providing a plurality of components of a hydraulic hybrid drive system.

8. The method defined in claim 7 including the additional step of cleaning the hydraulic hybrid drive system after assembly with the cradle in step (d) but before installing the integrated cradle and hydraulic hybrid drive module in the drive train system in step (e).

9. The method defined in claim 1 wherein step (b) is performed by providing a plurality of components of an electric hybrid drive system.

10. The method defined in claim 1 including the additional step of operating the hybrid drive system after assembly with the cradle in step (d) but before installing the integrated cradle and hybrid drive module in the drive train system in step (e).

11. The method defined in claim 1 including the additional step of testing the hybrid drive system after assembly with the cradle in step (d) but before installing the integrated cradle and hybrid drive module in the drive train system in step (e).

12. A method of installing a hybrid drive system in a drive train system comprising the steps of:
   (a) providing a vehicle including a drive train system having a source of rotational power, a power drive unit that is rotatably driven by the source of rotational power, and a rotatably driven device that is rotatably driven by the power drive unit;
   (b) providing a hybrid drive system including a high pressure accumulator, a low pressure oil reservoir, and a plurality of fluid conduits that are adapted to accumulate and store energy in the high pressure accumulator by retarding the drive train system during braking and to supply energy stored in the high pressure accumulator to assist in subsequently driving the drive train system;
   (c) providing a cradle;
   (d) initially assembling the cradle and a plurality of components, including the high pressure accumulator, the low pressure oil reservoir, and the plurality of fluid conduits, of the hybrid drive system together to provide an integrated cradle and hybrid drive module; and
   (e) subsequently installing the integrated cradle and hybrid drive module on the vehicle and in cooperation with the drive train system.

13. A method of installing a hybrid drive system in a drive train system comprising the steps of:
   (a) providing a vehicle including a drive train system having a source of rotational power, a power drive unit that is rotatably driven by the source of rotational power, and a rotatably driven device that is rotatably driven by the power drive unit;
   (b) providing a hydraulic hybrid drive system including an energy storage device that is adapted to store energy and a reversible energy transfer machine that is adapted to accumulate energy in the energy storage device by retarding the drive train system during braking and to supply energy stored in the energy storage device to assist in subsequently driving the drive train system;
   (c) providing a cradle;
   (d) initially assembling the cradle and a plurality of components, including the energy storage device and the reversible energy transfer machine, of the hybrid drive system together to provide an integrated cradle and hybrid drive module; and (e) subsequently installing the integrated cradle and hybrid drive module on the vehicle and in cooperation with the drive train system.

\* \* \* \* \*